Jan. 3, 1950 W. T. HANNA 2,492,991
SNAP HOOK WITH OPENING MEANS
Filed May 15, 1945
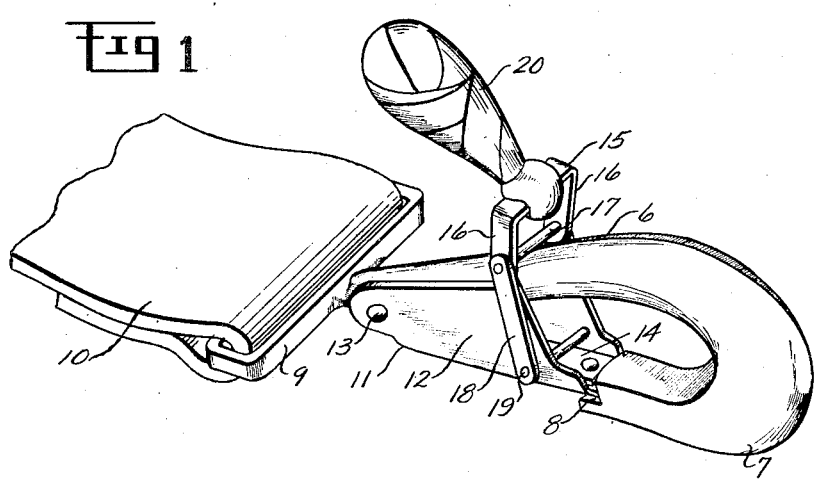
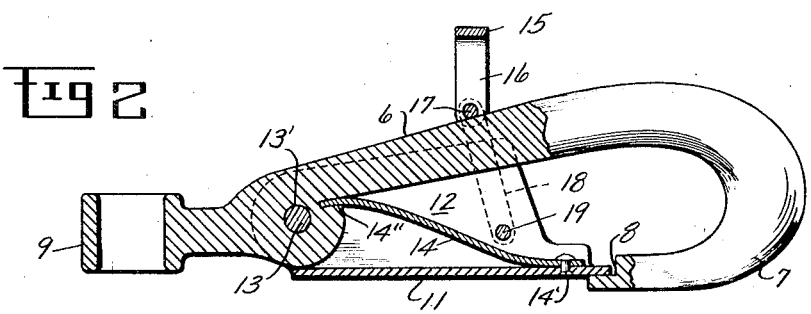
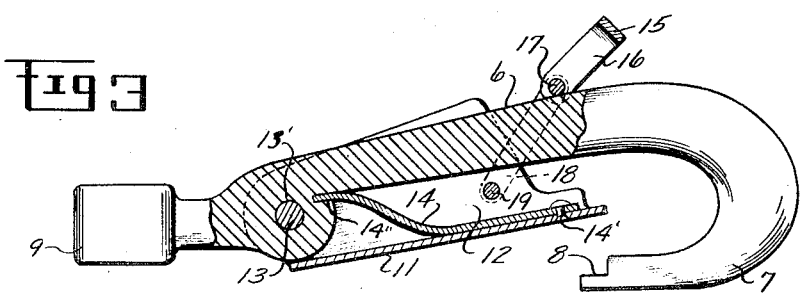
INVENTOR.
WARREN T. HANNA
BY Joseph M. Hazell
Wade Koontz
ATTORNEYS Patented Jan. 3, 1950

2,492,991

UNITED STATES PATENT OFFICE 2,492,991

SNAP HOOK WITH OPENING MEANS

Warren T. Hanna, Natick, Mass.

Application May 15, 1945, Serial No. 593,920

3 Claims. (Cl. 24—233)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in snap hooks comprising means for opening the closing element or snap of the hook, and more particularly such as are used on a parachute harness.

With snap hooks of this kind, and particularly when used on a parachute harness, it is found difficult to open the closing element and it requires a pressure directed transversely to the longitudinal axis of the snap hook and of the connected straps, so that two hands will be required in the opening of the snap element and releasing the hook from a connected ring or the like.

It is an essential object of this invention to provide an improved snap hook with means for readily opening the snap element by the use of one hand, and by exerting the force of that hand by a continuous pull in a direction substantially parallel to the longitudinal axis of the body of the snap hook and of the straps connected thereto.

A more particular object of this invention is to provide an improved snap hook with opening means thereon whereby the snap element can be readily opened by pulling manually on the opening means longitudinally of the snap hook and away from the attached strap thereby moving an element of said means along the hook body and effecting a camming action, to facilitate opening the snap element with one hand and readily releasing the hook from the connected ring.

These and various other objects and advantages are attained with this invention, as will become apparent from the following description, taken in connection with the accompanying drawings wherein the invention is shown in its preferred form, it being apparent that other arrangements and forms of construction may be resorted to for carrying out the objects and purposes of this invention.

In the drawing:

Fig. 1 is a perspective view of the improved snap hook embodying my invention.

Fig. 2 is a side view thereof, being partly in section and omitting the snap opening handle.

Fig. 3 is a side view similar to Fig. 2, but showing the snap element partly opened.

The drawing discloses my invention embodied in a snap hook which is especially adapted for use on a parachute harness and comprises a body 6 containing at one end a bent portion or hook arm 7 having at its end a seat 8. At the other end said body contains a transversely elongated eye 9, adapted for attachment to a strap 10. This snap hook contains a closing element or snap 11 which includes a pair of side flanges 12, a pivot pin 13 being extended through these side flanges and through an aperture 13' in the body 6 for pivotally mounting the element 11, so that its free end will rest in said seat 8. Yieldable means 14 is included for urging the element 11 to its closed position, and this is preferably in the form of a leaf spring having one end secured to element 11 by means 14' and the other end seated in a notch 14" provided in the body 6 adjacent the pivot pin 13.

The novel means which I provide herewith for opening this snap element 11 comprises a U-shaped member or yoke 15 including a pair of spaced legs 16. A pin 17 extends through said legs 16 and is slidable on the surface of said body 6, while links 18 connect said pin 17 and legs 16 with the closing element 11 by means of a pin 19 extending through the links and the flanges 12. Operating means 20 is attached to U-shaped member 15 and is adapted to be grasped by the hand for drawing the snap opening means in a direction parallel to the longitudinal axis of the snap hook and connected straps. By exerting force on said manual means 20 in a direction longitudinally of the snap hook, the pin 17 will slide along the exterior surface of said hook away from the eye 9 and the attached strap 10, and will thus impart camming action to the snap opening means for drawing the closing element 11 toward the body 6 to its open position, as indicated in Fig. 3. The hook can then also be drawn further forward by the one hand pulling on said means 20, and thus readily unhook it from the ring or eye to which it was attached.

It is apparent from the above disclosure that with this construction for opening the snap element, the force can be applied to member 20 in a direction longitudinally of the hook and of the attached strap of the parachute harness, and by drawing on member 20 in a direction away from the strap and parallel thereto, so that by this snap releasing means and attendant cam action the snap hook may be easily opened with one hand and at the same time the hook portion will be drawn loose on and can be readily unhooked from the attached ring or the like.

I claim:

1. A snap hook comprising an elongated body having a front surface and a rear inclined surface, and formed with a hook portion at one end having an entrance in the front surface, a hook closing element pivoted on the body and movable toward the front surface to close said hook portion, resilient actuating means between the body and the hook closing element, yieldably tensioning the hook closing element toward the front surface in its hook closing position, manually operable hook closing element actuating means including camming lever means pivoted to the hook closing element adjacent the rear surface of the body, said camming lever means having an abutment swingable therewith toward the hook portion into camming engagement with the rear inclined surface of the body to displace the hook closing element from its hook closing relation with the hook portion, and a manipulating handle connected to the free end of the camming lever means at the rear of the body and movable longitudinally along the rear surface of the body toward the hook portion to swing said abutment of the camming lever means into camming engagement with the rear of the body to open said hook closing element and simultaneously manipulate the body and hook portion in the unhooking direction to facilitate unhooking the same from a ring or the like to which the hook portion may be attached.

2. A snap hook comprising an elongated body having a front surface and a rear inclined surface formed with a hook portion at one end thereof, having an entrance in the front surface, a hook closing element pivoted to the other end of the body to swing toward the front surface to close said hook portion, means between the body and the hook closing element yieldably maintaining the hook closing element in its hook closing position, a pivoted camming yoke straddling the rear inclined surface of the body, pivotally connected to the hook closing element intermediate the hook portion and the hook closing element pivot, a hook closing element actuating member extending across said yoke at the rear inclined surface of the body to contact with and travel upon the rear inclined surface of the body to move the hook closing element to inoperative position when the yoke is swung toward said hook portion, and handle means connected to said yoke at the rear of the body for swinging said yoke longitudinally of the body about its pivot and towards said hook portion to swing said hook closing element actuating member into camming contact with the rear inclined surface of the hook body to move the hook closing element out of said hook portion and simultaneously move the body to move the hook portion in hook disengaging direction, relative to an article which is hooked in said hook portion.

3. A snap hook with manual opening and manipulating means therefor comprising an elongated body having a front surface, a relatively inclined rear surface, and a hook portion at one end having an entrance through the front surface, a pivoted closure for the hook entrance having a fulcrum on the body adjacent the other end thereof, formed with a U-shaped closure portion extending across the entrance toward the hook portion having parallel side flanges extending toward the rear surface at opposite sides of the body, spring means operable between the closure member and the body for urging the closure member toward the front surface to close the entrance to the hook portion, a pair of link members freely pivoted at one end to the exterior of the side flanges of the closure member adjacent the bottom of the U portion thereof, intermediate the closure member fulcrum and the hook portion and extending across the side flanges and beyond said rear inclined surface of the body, an abutment member extending across the inclined surface of the body in contact therewith having spaced ends interconnected to the free ends of the links, a substantially U-shaped yoke member extending transversely across the rear surface of the body having parallel side arms pivoted at their outer ends to said abutment member intermediate the inner adjacent surfaces of the body, and a handle member connected to the yoke member between the side arms thereof, whereby movement of the handle member toward the hook portion end of the body slidably engages the abutment member on the inclined rear surface of the body to swing links about their pivots to actuate the closure member about its fulcrum and displaces the closure member out of the entrance, and continued movement in the same direction moves the hook portion in an unhooking direction.

WARREN T. HANNA.

REFERENCES CITED

The following references are of record in the file of this patent:

UNITED STATES PATENTS

| Number | Name | Date |
|---|---|---|
| 47,972 | Mund | May 30, 1865 |
| 160,266 | Haynes | Mar. 2, 1875 |
| 219,031 | Trenchevent et al. | Aug. 26, 1879 |
| 516,897 | McMillan | Mar. 20, 1894 |
| 1,180,387 | Farrand | Apr. 25, 1916 |
| 1,786,978 | Aronson | Dec. 30, 1930 |
| 2,246,630 | Johnson | June 24, 1941 |

FOREIGN PATENTS

| Number | Country | Date |
|---|---|---|
| 12,880 | Great Britain | June 1, 1909 |
| 743,590 | France | Jan. 10, 1933 |